Aug. 1, 1950     C. L. FENG     2,517,188
HYDRAULICALLY CONTROLLED TRANSMISSION
Filed March 31, 1947     3 Sheets-Sheet 1

Inventor
Chung Liao Feng

By Clarence A. O'Brien
and Harvey B. Jacobson
Attorneys

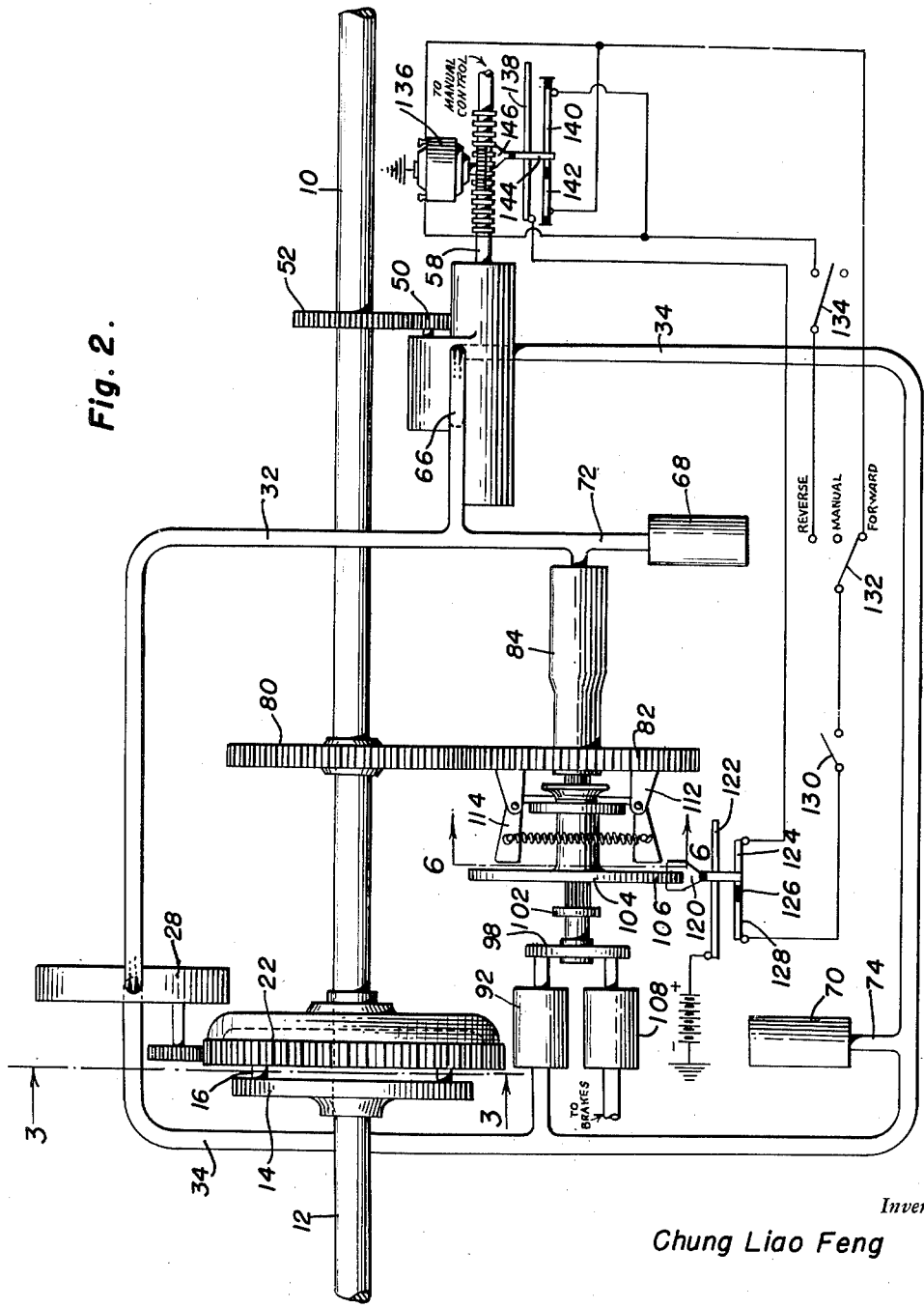

Aug. 1, 1950           C. L. FENG           2,517,188
HYDRAULICALLY CONTROLLED TRANSMISSION
Filed March 31, 1947           3 Sheets-Sheet 3
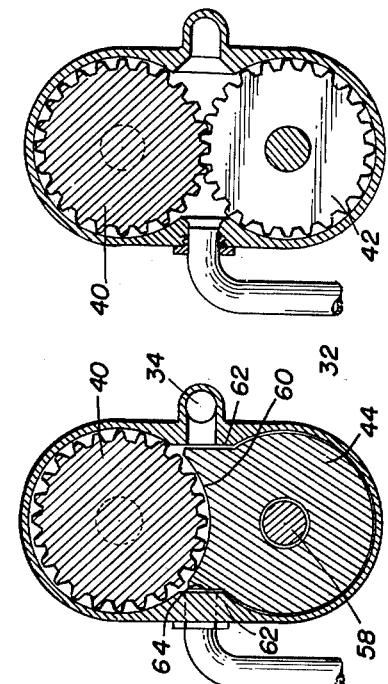
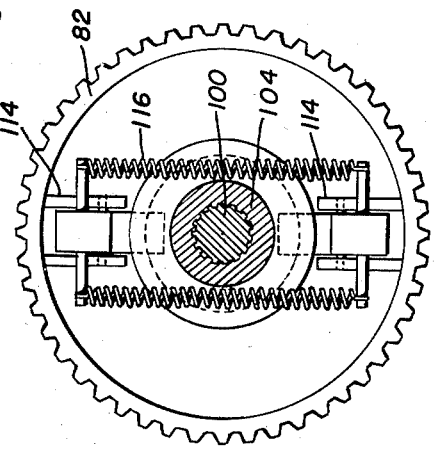
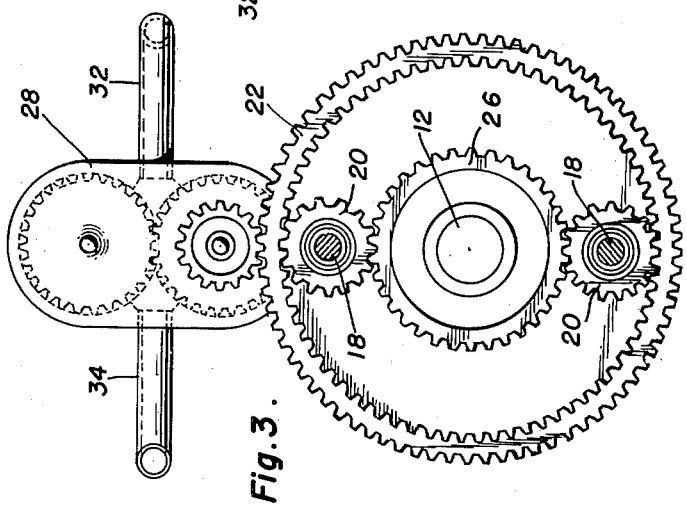
Inventor
Chung Liao Feng
By *Clarence A. O'Brien and Harvey B. Jacobson*
Attorneys

UNITED STATES PATENT OFFICE 2,517,188

HYDRAULICALLY CONTROLLED TRANSMISSION

Chung Liao Feng, Philadelphia, Pa.

Application March 31, 1947, Serial No. 738,451

8 Claims. (Cl. 74—687)

This invention relates generally to power transmissions, and more particularly to a hydraulically controlled transmission for connection with a drive shaft and a driven shaft, and comprising a sun gear secured to the drive shaft with a plurality of planetary gears rotatably mounted on said driven shaft and a ring gear engaged with the planetary gears, the ring gear being operatively connected with a hydraulic system including a pair of hydraulic pumps, variable speed and reversal of direction of the driven shaft being accomplished by varying the capacity of one of the pumps.

A primary object of this invention is to provide means whereby an infinite number of rotational speed ratios may be obtained, the drive shaft and the driven shaft being maintained in constant mechanical connection.

Another object of this invention is to provide means whereby a reversal of the driven shaft may be obtained without reversal of the drive shaft.

Still another object of this invention is to provide means whereby a pair of hydraulic pumps, one of which is of variable capacity, may be operatively connected with a power transmission, to vary the speed of a ring gear, in order to provide for the above described variation in rotational speed ratios.

Still another object of this invention is to provide means whereby the differential in pressure between the two sides of one of these pumps functions to automatically change said speed ratios.

Another object of this invention is to combine with the pressure control system described in the immediately preceding object with an auxiliary system embodying ratio control dependent upon the rotational speed of the drive shaft, this last feature of the invention being of paramount importance when the device is applied to a relatively small powered prime mover and a varying load.

Another object of this invention is to provide a transmission means which is ideally suitable for use with automotive vehicles, and is further adapted for such use with auxiliary means adapted to automatically return the transmission to neutral when brakes are applied to the automotive vehicle.

Still another object of this invention is to provide a variable and reversible power transmission, in which may be incorporated mechanical, electrical or hydraulic remote-control systems which may be combined with manual control.

A last object to be specifically mentioned is to provide a device of this character which is relatively inexpensive and practicable to manufacture, extremely simple to install, adjust and use, and which will give generally efficient and durable service.

With these objects definitely in view, this invention resides in certain novel features of construction, combination and arrangement of parts and portions as will be described hereinafter in detail and particularly pointed out in the claims hereunto appended, and illustrated in the accompanying drawings which form a material part of this application, and in which—

Figure 2 is a very similar view, the main elements of the invention being illustrated in elevation, rather than in section, as in Figure 1, the figure including a diagrammatic sketch of a possible electrical control system;

Figure 3 is a vertical transverse sectional view, taken on the line 3—3 in Figure 2;

Figure 4 is a vertical transverse sectional view, taken on the line 4—4 in Figure 1;

Figure 1:
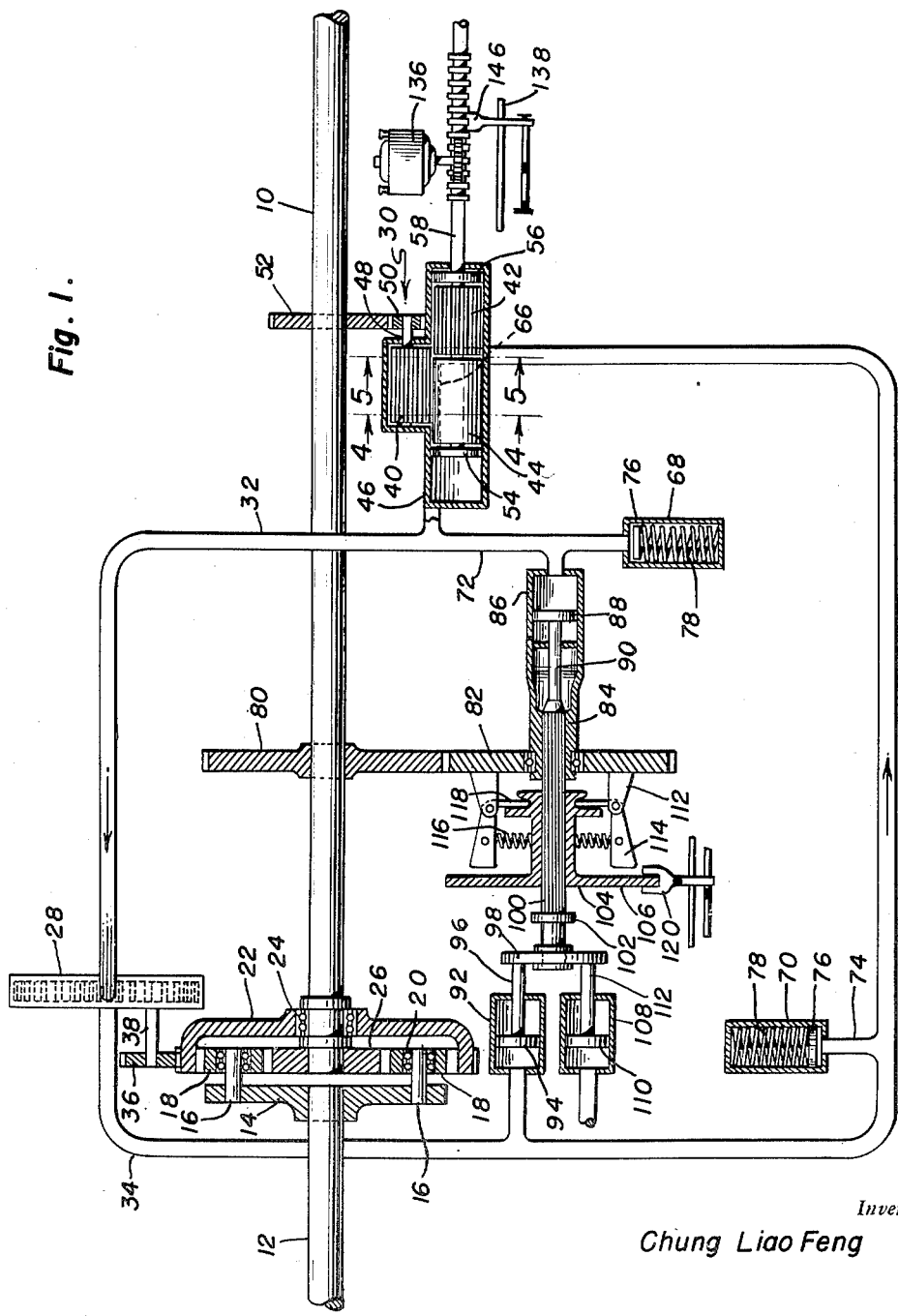
Figure 1 is a diagrammatic view of the elements of this invention.

Figure 5 is a similar view, taken on the line 5—5 in Figure 1, and it should be noted that Figures 4 and 5 are adapted to illustrate how the pump of variable capacity may be constructed; and Figure 6 is a vertical sectional view of a portion of the speed ratio control system, particularly the portion embodying control according to the speed of the drive shaft, the view being taken on the line 6—6 in Figure 2.

Similar characters of reference designate similar or identical parts and portions throughout the specification and throughout the several views of the drawings.

Referring now to these drawings in detail, it will be apparent that the device is adapted for use with a drive shaft 10 and a driven shaft 12, the bearings for which are deleted from these drawings as not being material to this invention.

The driven shaft 12 is provided with a frame member 14 rigidly secured on the end thereof and this frame is provided with stub shafts 16, upon which are freely rotatably mounted a similar number of planetary gears 18. The bearings of these planetary gears may be of any suitable character, the essential feature thereof being the proper retention of the planetary gears 18 on the outer ends of the stub shafts 16. A ring gear 22 is interiorly geared to engage the planetary gears 18 and is freely rotatably mounted, coaxially with the drive shaft 10, and preferably on a suitable bearing 24 provided adjacent the end of the said drive shaft. A sun gear 26 is rigidly secured to the extreme end of the drive shaft 10 and is adapted to continuously engage the planetary gears 18.

It will be evident from the foregoing that rotation of the drive shaft 10 will be transmitted to the driven shaft 12 only in accordance with the rotation or non-rotation of the ring gear 22. Accordingly, this invention contemplates the provision of means to regulate the rotation of this ring gear 22. In brief, the system provided for control of the rotation of the ring gear 22 includes a hydraulic pump 28, a second hydraulic pump 30 of variable capacity, connecting tubes 32 and 34, and means for automatically controlling the capacity of the variable capacity pump 30, which will be hereinafter described. With the pump 30 at full capacity, the ring gear 22 is rotated at sufficient speed to cause reversal of the driven shaft 12.

The hydraulic pump 28, which actually functions as a hydraulic motor rather than as a pump, is controlled by the rate of flow of hydraulic fluid from the tube 32, and the impeller of this pump or motor 28 is connected to the gear wheel 36 by a short shaft 38, suitable bearings being provided, of course, to maintain this gear 36 in engagement with the ring gear 22. The rate of flow of the hydraulic fluid will, therefore, be seen to be the factor controlling or determining whether the ring gear 22 will be accelerated or alternatively braked or retarded. The variable capacity pump 30 is also connected to the tubes 32 and 34 and may be of the character illustrated in the drawings comprising an impeller 40, a similar impeller 42, and an idler 44, mounted in a suitable casing 46. The impeller 40 is driven by a short shaft 48 connected to the pinion 50 which is, in turn, driven by the gear 52 rigidly secured on the drive shaft 10. Guide members 54 and 56 of disc form are provided on the outer ends of the impeller 42 and the idler 44, and all these last-mentioned parts are secured to the control shaft 58. The idler 44 will preferably be formed with an arcuate upper face 60 having only a small clearance from the teeth or blades of the impeller 40. This idler must be retained from rotation and the casing 46 will, to that end, be provided with flat, longitudinally disposed rib portions 62 against which the flat side faces 64 of the upper portion of the idler 44 abut and slide. The capacity of the pump 30 may, by a construction analogous to that described immediately above, be varied by longitudinal movement of the assembly including the impeller 42 and the idler 44, and the control of the capacity of this pump is delegated to the shaft 58, this shaft being moved longitudinally either manually or automatically, as will be hereinafter described. In this connection, it should be carefully noted that the tube 32 is connected to the variable capacity pump 30 on the side thereof illustrated as to the front in Figure 1, and the tube 34 is connected to this pump as to the rear in Figure 1, this arrangement being more clearly illustrated in Figures 4 and 5. Furthermore, it should be noted that the inlet and outlet of this pump must be arranged to remain operative for all positions of the impeller 42, as indicated by the elongated inlet 64, shown in dotted outline 66.

A pair of surge chambers 68 and 70 are connected to extending portions 72 and 74 of the tubes 32 and 34, respectively, the action of the surge chambers being to absorb and lessen the effect of sudden changes in the load on the driven shaft 12, the torque on the drive shaft 10, or, more directly, in the rate of flow of the hydraulic fluid through the several tubes, each surge chamber comprising a casing rigidly secured to the ends of the extending portions 72 and 74 of the tubes, a piston member 76 and a spring compressed between the end of the casing and the piston member, as indicated at 78.

Referring now to the means for automatically controlling the rate of flow of hydraulic fluid through the tubes and the pump or motor 28, the drive shaft 10 has rigidly secured thereto a gear 80 which is operatively engaged with a gear 82 mounted for free rotation upon a casing 84. This casing 84 is provided with a cylinder 86 and a piston 88 terminally connected on the end of the piston rod 90, the cylinder 86 communicating with the tube 32 and the piston 88 being urged, as to the left in Figure 1, by the pressure of the fluid in the tube 32. A very similar cylinder 92 is connected to the tube 34 and a piston 94 is reciprocatively mounted within this cylinder and connected to a piston rod 96. The adjacent ends of the piston rods 90 and 96 are joined together by a cross member 98 and a fluted shaft 100 slidably mounted in one end of the casing 84. It will be evident that increase of pressure in the tube 32 will be accompanied by decrease of pressure in the tube 34, and vice versa, and that the pistons 88 and 94 will be acted upon simultaneously and that the fluted shaft 100 will be moved as to the left when pressure is increased in the tube 32, that is, when the capacity of the pump 30 is increased. When the fluted shaft 100 is moved to the left, the collar 102 is maintained out of engagement with the sliding sleeve 104 which is interiorly fluted to move freely longitudinally on the fluted shaft 100 and to turn therewith, a right angular flange portion 106 of this sliding sleeve being provided to act as an actuating member for the electric control system of the device.

A third cylinder 108, similar to the cylinders described above and communicating with the brake system, when this device is used on an automotive vehicle, is provided with a piston 110 and a piston rod 112 which is secured to the cross member 98. Application of the brakes to such an automotive vehicle will be made to increase the pressure of the hydraulic fluid contained behind the piston 110 in the cylinder 108 and the fluted shaft 100 will be moved, as to the right in Figure 1, so that the collar 102 will contact the sliding sleeve 104 and force the same to the right, to give the same electric signal, as hereinafter described, as is given when the pressure of the hydraulic fluid in the tube 34 is considerably in excess of the pressure in the tube 32. It will be seen that increase of load on the driven shaft 12 or application of brakes to an automotive vehicle in which this device is installed will, therefore, tend to move the control elements in the same direction, while increase of rotational speed of the drive shaft 10 will increase the rotational speed of the gear 82. A pair of attachment flanges 112 are rigidly secured to this gear 82 and a pair of bell cranks 114 are pivotally secured to the other ends of these flanges 112. A helical spring 116 is tensioned between the corresponding arms of the bell cranks 114 and the other pair of corresponding arms 118 of the bell cranks are made to engage a groove in one end of the sliding sleeve 104. Increase of rotational speed of the shaft 10 will, therefore, tend to cause the outer ends of the bell cranks 114 to diverge after the manner of fly weights in a governor and the sleeve 104 will be moved as to the left in Figure 1.

The speed ratios can be manually controlled by longitudinal movement of the control shaft 58, but it is preferred that a hydraulic, mechanical or electrical means be incorporated with this device in order to provide for automatic control of the said speed ratios to correspond with the varying load on the shaft 12 and the speed of the drive shaft 10. Accordingly, a bifurcated member 120 is suitably mounted for reciprocative movement in contact with a pair of sliding contact strips 122 and 124. It will be noted that the actual contact member of the member 120 is insulated from the bifurcated portion which is in contact with the metallic flange member 106. A source of direct current is connected to the contact plate 122 and both contact strips 122 and 124 are, of course, insulated, the latter being divided by an insulating dead spot 126. The end 128 of the contact strip 124 is connected through a master switch 130 and a control switch 132, through an accelerator switch 134, opened when the accelerator lever is retracted to "off" or neutral position, and thence directly to one terminal of a reversible motor 136. The other end of the contact strip 124 is connected directly to the contact strip 138 which coacts with a similar contact strip divided into two portions 140 and 142, a brush 144 being provided to connect these contact strips and operated by a member 146 associated with the control shaft 58, it being understood that the elements herein illustrated in the drawings and described are not presented as properly detailed mechanical units and that the drawings are diagrammatic in character. One end of each of the contact strip portions 140, 142 is connected to a terminal of the reversible motor 136 and to the previously mentioned terminal of the motor, respectively, the end 144 being connectable through the accelerator switch 134 to the end 128 of the contact strip 124 when the manual control switch 132 is moved into "reverse" position.

It is thought that the manual operation of this invention will be clearly understood from the foregoing description and the electrical or automatic operation is, in many respects, very similar to the manual control. For example, when the various elements are in the positions represented in Figure 2, the rotational speed of the drive shaft 10 may be gradually increasing and while the pressure of the hydraulic fluid is greater in the tube 32 than in the tube 34 and thus still forcing the pump or motor 28 to brake the ring gear 22, the gradual increase of the speed in the drive shaft 10 will also gradually force the guiding sleeve 104 as to the left, moving the switch brush 120 to the left. When the switch brush 120 reaches the dead spot 126, the current will be cut off from the motor 136, the operation of this motor, up until this point is reached, being such as to force the control shaft 58 as to the right, that is, to close or render the variable capacity pump 30 ineffective. It will be noted that the brush wiper arm 144 will remain on contact 140 for all forward movement and on contact 142 for all reverse movement. When the flow of hydraulic fluid through the tubes is reduced to a minimum or completely inhibited, the transmission will be functioning in substantially 1-1 ratio, corresponding to high gear in an ordinary automotive vehicle. When the load is increased on the driven shaft 12, a reverse action of the various elements is initiated by the movement of the fly weight bell cranks 114 under the influence of the spring 116, as a result, of course, of the reduction in the rotational speed of the drive shaft 10.

A very similar action occurs when the device is switched to the reverse position by means of the manual control switch 132. With the drive shaft 10 still rotating in the same direction and at a relatively high speed, the switch brush member 120 will connect the source of electrical power to the portion 128 and the other terminal of the electric motor 136 will be directly connected. When the engine is speeded up, the accelerator switch 134 will be closed and the fly weight bell-cranks will operate to force the brush member 120 onto the portion 128. Furthermore, the motor 136 will be energized and the pump 30 will be adjusted for full capacity operation. As explained above, at full capacity operation of pump 30, the ring gear 22 and sun gear 26 will be rotated sufficiently fast to result in a reverse drive of the shaft 12. As will be evident from the drawings, the electrical connections are easily made so that the reversible motor 136 acts in unison and as an auxiliary to the manual control. Finally, it should be noted that braking action with the resultant increase of pressure in the tube 34 and the mechanical forcing of the slide 104 as to the right in Figure 2 is prevented from changing the ratio past the zero or neutral position, since movement of the sliding brush member 120 onto the right-hand end of the contact strip 124 will immediately arrest this action as the elements will then be in a position as indicated in Figure 2. It will thus be seen that reversal of the transmission will not result from an application of the brakes.

Obviously no attempt has been made in this application to describe the various modifications of structure whereby this invention may be implemented and reduced to practice, and though there has been shown a particular embodiment of this invention, this application is not limited to this particular embodiment, but it is desired to include in the scope of this invention the construction, combination and arrangement of parts and portions substantially as set forth in the appended claims.

What is claimed as new and desired to be secured by Letters Patent is:

1. A hydraulically controlled transmission for connection with a drive shaft and a driven shaft, comprising a sun gear secured to said drive shaft, a frame rigidly secured to said driven shaft, planetary gears rotatably mounted on said frame, a ring gear engaged with said planetary gears and mounted for free rotation coaxially with said sun gear, a hydraulic system including a pair of hydraulically interconnected hydraulic pumps operatively connected to said ring gear and said drive shaft respectively, and governor means operated by said drive shaft to vary the capacity of one of said pumps.

2. A hydraulically controlled transmission for connection with a drive shaft and a driven shaft, comprising a sun gear secured to said drive shaft, a frame rigidly secured to said driven shaft, planetary gears rotatably mounted on said frame, a ring gear engaged with said planetary gears and mounted for free rotation coaxially with said sun gear, a hydraulic system including a pair of hydraulically interconnected hydraulic pumps operatively connected to said ring gear and said drive shaft respectively, and governor means operated by said drive shaft to vary the capacity of one of said pumps in accordance with the speed of rotation of the drive shaft.

3. A hydraulically controlled transmission for connection with a drive shaft and a driven shaft, comprising a sun gear secured to said drive shaft, a frame rigidly secured to said driven shaft, planetary gears rotatably mounted on said frame, a ring gear engaged with said planetary gears and mounted for free rotation coaxially with said sun gear, a hydraulic system including a pair of hydraulically interconnected hydraulic pumps operatively connected to said ring gear and said drive shaft respectively, and means to vary the capacity of one of said pumps in accordance with the speed of rotation of the drive shaft and the load on the driven shaft comprising a governor having a shaft driven by said drive shaft, a sliding sleeve on said shaft of the governor and turned thereby, rotational speed responsive means to bias said sleeve into shifting on its shaft according to the speed of said drive shaft, said variable capacity pump having fluid impelling gears, a control shaft adapted for shifting one of said gears relative to the other of said gears, and means for operatively connecting said sleeve with said control shaft.

4. A hydraulically controlled transmission for connection with a drive shaft and a driven shaft, comprising a sun gear secured to said drive shaft, a frame rigidly secured to said driven shaft, planetary gears rotatably mounted on said frame, a ring gear engaged with said planetary gears and mounted for free rotation coaxially with said sun gear, a hydraulic system including a pair of hydraulically interconnected hydraulic pumps operatively connected to said ring gear and said drive shaft respectively, and means to vary the capacity of one of said pumps in accordance with the speed of rotation of the drive shaft and the load on the driven shaft, said load being gauged according to varying differential in pressures on the two sides of one of said pumps by a piston acted upon by said pressures simultaneously, and means for varying the capacity of said one pump in sympathy with the shifting of said piston.

5. A hydraulically controlled transmission for connection with a drive shaft and a driven shaft, comprising a sun gear secured to said drive shaft, a frame rigidly secured to said driven shaft, planetary gears rotatably mounted on said frame, a ring gear engaged with said planetary gears and mounted for free rotation coaxially with said sun gear, a hydraulic system including a pair of hydraulically interconnected hydraulic pumps operatively connected to said ring gear and said drive shaft respectively, and means to vary the capacity of one of said pumps, said one of said pumps having a variable capacity sufficient to cause sufficient variation in the rotational speed of said ring gear to effect reversal as well as variable speed of rotation of said driven shaft said means comprising a governor having a shaft driven by said drive shaft, a sliding sleeve on said shaft of the governor and turned thereby, rotational speed-responsive means to bias said sleeve into shifting on its shaft according to the speed of said drive shaft, said variable capacity pump having fluid impelling gears, a control shaft adapted for shifting one of said gears relative to the other of said gears, and means for operatively connecting said sleeve with said control shaft.

6. A transmission according to claim 3, and wherein said last-mentioned means includes an electric motor operatively associated with said control shaft, and an electric circuit including a source of energy and said motor, and switch means operated by said sleeve and controlling said circuit.

7. A hydraulically controlled transmission for connection with a drive shaft and a driven shaft, comprising a sun gear secured to said drive shaft, a frame rigidly secured to said driven shaft, planetary gears rotatably mounted on said frame, a ring gear engaged with said planetary gears and mounted for free rotation coaxially with said sun gear, a hydraulic system including a pair of hydraulically interconnected hydraulic pumps operatively connected to said ring gear and said drive shaft respectively, and means to vary the capacity of one of said pumps in accordance with the speed of rotation of the drive shaft and the load on the driven shaft, comprising a piston acted upon by pressures on the two sides of one of said pumps simultaneously, and means for varying the capacity of said one pump in sympathy with the shifting of said piston, said last-mentioned means also including an electrical circuit which may be made inoperative to allow manual control of said control shaft, said piston being also connected for being biased in one direction by a force applied from outside the system.

8. A transmission according to claim 1, and including a surge chamber on each side of the pump having variable capacity.

CHUNG LIAO FENG.

REFERENCES CITED

The following references are of record in the file of this patent:

UNITED STATES PATENTS

| Number | Name | Date |
|---|---|---|
| 1,077,454 | Cooke | Nov. 4, 1913 |
| 1,197,789 | Bluemel | Sept. 12, 1916 |
| 1,981,805 | Kacer et al. | Nov. 20, 1934 |
| 2,173,855 | Orshansky | Sept. 26, 1939 |
| 2,212,046 | Ross | Aug. 20, 1940 |
| 2,373,138 | Morith | Apr. 10, 1945 |

FOREIGN PATENTS

| Number | Country | Date |
|---|---|---|
| 556,470 | France | Apr. 14, 1923 |